United States Patent
Wu et al.

(10) Patent No.: US 11,241,298 B2
(45) Date of Patent: Feb. 8, 2022

(54) OVERLOAD PROTECTION DEVICE AND HIGH-SPEED DENTAL HANDPIECE COMPRISING SAME

(71) Applicant: GUILIN WOODPECKER MEDICAL INSTRUMENT Co., Ltd., Guangxi (CN)

(72) Inventors: Xunxian Wu, Guangxi (CN); Wei Li, Guangxi (CN); Hongcan Wang, Guangxi (CN); Yongchao Huang, Guangxi (CN); Zhaolin Li, Guangxi (CN); Qingjian Deng, Guangxi (CN)

(73) Assignee: GUILIN WOODPECKER MEDICAL INSTRUMENT CO., LTD., Guangxi (CN)

( * ) Notice: Subject to any disclaimer, the term of this patent is extended or adjusted under 35 U.S.C. 154(b) by 404 days.

(21) Appl. No.: 16/348,452

(22) PCT Filed: Oct. 12, 2017

(86) PCT No.: PCT/CN2017/105786
§ 371 (c)(1),
(2) Date: May 8, 2019

(87) PCT Pub. No.: WO2018/099193
PCT Pub. Date: Jun. 7, 2018

(65) Prior Publication Data
US 2020/0054417 A1    Feb. 20, 2020

(30) Foreign Application Priority Data

Nov. 29, 2016  (CN) .......................... 201611073183.5

(51) Int. Cl.
*A61C 1/00*  (2006.01)
*A61C 1/05*  (2006.01)
(Continued)

(52) U.S. Cl.
CPC ............ *A61C 1/0038* (2013.01); *A61C 1/052* (2013.01); *F01B 25/02* (2013.01); *F01D 15/062* (2013.01); *F16K 17/04* (2013.01); *F16K 17/065* (2013.01)

(58) Field of Classification Search
CPC ......... A61C 1/0038; A61C 1/052; A61C 1/05; F16K 17/20; F16K 17/30; F16K 17/04;
(Continued)

(56) References Cited

U.S. PATENT DOCUMENTS 3,865,505 A * 2/1975 Flatland ................ F01D 15/062
                                                          415/49
4,033,039 A    7/1977 Lohn et al.
(Continued)

FOREIGN PATENT DOCUMENTS

CN      203074888 U    7/2013
CN      103486287 A    1/2014
(Continued)

*Primary Examiner* — Heidi M Eide
(74) *Attorney, Agent, or Firm* — Craft Chu PLLC; Andrew W. Chu

(57) ABSTRACT

The overload protection device used on a high-speed dental handpiece includes a valve body, a piston, an elastic member, and a valve plug. The valve body is provided with an air chamber and an air intake passage in communication with each other. The piston is arranged in the air chamber. The valve plug is arranged at an end of the air chamber away from the air intake passage and is connected with the valve body. The elastic member is arranged between the piston and the valve plug. An outer surface of the valve body is provided with a plurality of air discharging holes which is in communication with the air chamber. The piston is capable of opening or closing the air discharging holes when moving vertically within the air chamber. The present invention further discloses a high-speed dental handpiece with an overload protection device.

9 Claims, 3 Drawing Sheets

(51) Int. Cl.
    *F16K 17/06* (2006.01)
    *F16K 17/04* (2006.01)
    *F01B 25/02* (2006.01)
    *F01D 15/06* (2006.01)

(58) Field of Classification Search
    CPC ........ F16K 17/00; F16K 17/003; F01B 25/02;
    F01D 15/062
    See application file for complete search history.

(56) References Cited

U.S. PATENT DOCUMENTS

| | | | | |
|---|---|---|---|---|
| 4,074,434 | A | * | 2/1978 | Nielsen ................ A61C 1/0038 433/100 |
| 5,215,114 | A | * | 6/1993 | Breyer ................ F16K 17/0433 137/469 |
| 2006/0286505 | A1 | * | 12/2006 | Kawakubo ........... A61C 1/0038 433/132 |

FOREIGN PATENT DOCUMENTS

| CN | 106491217 A | 3/2017 |
|---|---|---|
| CN | 206026455 U | 3/2017 |

* cited by examiner

OVERLOAD PROTECTION DEVICE AND HIGH-SPEED DENTAL HANDPIECE COMPRISING SAME

TECHNICAL FIELD

The present invention relates to the field of medical instruments, and more particularly, to an overload protection device and a high-speed dental handpiece including the same.

BACKGROUND

In an existing dental handpiece, a needle is driven to run at a high speed through a rotor which is arranged on a core and which is driven by compressing air or through mechanical transmission implemented by gears and the like, so as to cut a tooth to remove carious tooth tissues, or so as to prepare the porcelain tooth or to grind the denture.

In actual use, an air pressure for the high-speed dental handpiece is much higher than 0.22 MPa, many doctors use an air pressure of 0.3-0.4 MPa. Excessive high air pressure causes a rotation speed of the high-speed dental handpiece to exceed a normal rotation speed, and the excessive high rotation speed accelerates the wear of a bearing. As a result, the service life of the bearing is shortened, which shortens the service life of the high-speed dental handpiece. At present, various brands of the high-speed dental handpieces at home and abroad are usually installed with overload protection devices, namely, pressure relief valves. When the air pressure used by the doctor is too high, the pressure relief valve automatically adjusts the air pressure, so that the rotation speed of the high-speed dental handpiece is always within a normal range, thereby achieving overload protection. However, at present, the pressure relief valves used in various brands of the high-speed dental handpieces usually have a problem of relatively complicated structure and higher cost.

SUMMARY

A technical problem to be solved by the present invention is to provide an overload protection device and a high-speed dental handpiece including the same, in order to solve the deficiencies of the prior art.

The technical solution of the present invention for solving the above technical problem is as follows. An overload protection device used on a high-speed dental handpiece includes: a valve body, a piston, an elastic member, and a valve plug. The valve body is provided with an air chamber and an air intake passage which are in communication with each other. The piston is arranged in the air chamber, and an outer surface of the piston abuts closely against an inner wall of the air chamber. The valve plug is arranged at an end of the air chamber away from the air intake passage and is connected with the valve body. The elastic member is arranged between the piston and the valve plug. An outer surface of the valve body is provided with a plurality of air discharging holes which is in communication with the air chamber. The piston is capable of opening or closing the air discharging holes when moving vertically within the air chamber.

The beneficial effects of the present invention lie in the followings. The structure is simpler; the processing is more convenient; the cost is lower; and the technical problem that the existing overload protection device has a complicated structure and a high cost is solved.

On basis of the above technical solution, the present invention may further be improved as follows.

Further, an outer wall of the piston is provided with an annular groove.

A further beneficial effect of using the above technique lies in the following. A contact area between the piston and the inner wall of the valve body is reduced, so that the piston moves more smoothly inside the valve body.

Further, the axial centers of the plurality of air discharging holes formed in the outer surface of the valve body are located on the same plane.

Further, after the overload protection device is assembled, the annular groove arranged on the piston is opposite to the air discharging holes formed in the valve body.

Further, the number of the air discharging holes in the outer surface of the valve body is two, and the axial centerlines of the two air discharging holes are collinear.

A further beneficial effect of using the above technique lies in the followings.

Further, the piston has a circular cross section.

Further, the elastic member is a spring.

Further, the valve plug and the valve body are detachably connected.

Further, the valve plug and the valve body are threadedly connected.

A further beneficial effect of using the above technique lies in that the maintenance is more convenient.

A high-speed dental handpiece with an overload protection device includes a dental handpiece body, a side tube, and the overload protection device described above. One end of the side tube is in communication with an air intake passage, and the other end of the side tube is in communication with a driving air tube on the dental handpiece body.

The beneficial effects of the present invention lie in the followings. The air pressure delivered from the driving air tube to the rotation device of the dental handpiece can be automatically adjusted, so that the rotation speed of the dental handpiece is always within the normal range, thereby realizing overload protection, which ensures the service life of the bearing and the service life of the dental handpiece. Meanwhile, the cooperation between the overload protection device and the dental handpiece is achieved by communicating the overload protection device with the driving air tube through the side tube. This arrangement effectively reduces the production cost.

Figure 1:
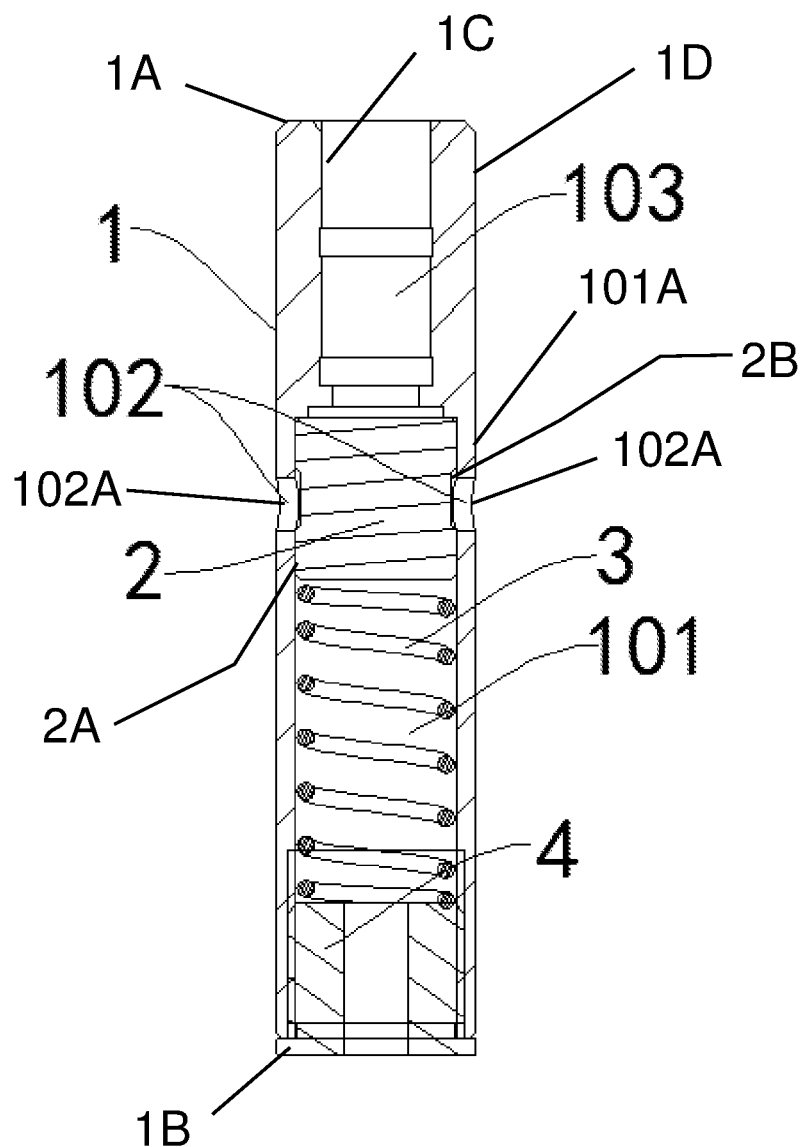
FIG. 1 is a schematically structural view of an overload protection device used on a high-speed dental handpiece according to the present invention.

In the drawings, the list of parts represented by reference numerals is as follows: 1. valve body, 101. air chamber, 102. air discharging hole, 103. air intake passage, 2. piston, 3. elastic member, 4. valve plug, 5. dental handpiece body, 501. driving air tube, and 6. side tube.

DETAILED DESCRIPTION

The principles and features of the present invention are described below with reference to the accompanying drawings. The examples are intended to be illustrative only and are not intended to limit the scope of the present invention.

As shown in FIG. 1, the present invention discloses an overload protection device used on a high-speed dental handpiece. The overload protection device comprises a valve body 1 (having a first end 1A, a second end 1B, an inner wall 1C, and an outer surface 1D), a piston 2, an elastic member 3, and a valve plug 4. The valve body 1 is provided with an air chamber 101 and an air intake passage 103 which are in communication with each other; an end of the air intake passage 103 away from the air chamber 101 is in communication with the outside environment; and an end of the air chamber 101 away from the air intake passage 103 is also in communication with the outside environment. The piston 2 is arranged in the air chamber 101; and an outer surface (an outer piston surface 2A) of the piston 2 abuts closely against an inner wall of the air chamber 101. The valve plug 4 is arranged at the end of the air chamber 101 away from the air intake passage 103 and is connected with the valve body 1. The elastic member 3 is arranged between the piston 2 and the valve plug 4, and the elastic member 3 allows the upper end face of the piston 2 to abut against the communication location (communication location 101A) between the air chamber 101 and the air intake passage 103. An outer surface of the valve body 1 is provided with a plurality of air discharging holes 102 which is in communication with the air chamber 101. The piston 2 is capable of opening or closing the air discharging holes 102 when moving vertically within the air chamber 101.

The overload protection device according to the present invention has the biggest characteristics that the structure is simpler; the processing is more convenient; the cost is lower; and the technical problem that the existing overload protection device has a complicated structure and a high cost is solved.

In order to ensure smooth movement of the piston 2 within the air chamber 101 arranged on the valve body 1, the present invention further improves the piston 2. Specifically, the outer wall of the piston 2 is provided with the annular groove (2B) through which the contact area of the piston 2 with the inner wall of the valve body 1 is reduced during the movement.

In the present invention, the axial centers of the plurality of air discharging holes 102 formed in the outer surface of the valve body 1 are on the same plane. The number of the air discharging holes 102 is preferably two, and the axial centerlines of the two air discharging holes 102 are collinear. The main reason for this arrangement is that it can ensure the stability of the piston 2 during deflation of the overload protection device. Meanwhile, the processing is facilitated, and the processing cost is reduced.

Further, after the overload protection device is assembled, the annular groove arranged on the piston 2 is opposite to the air discharging holes 102 formed in the valve body 1.

In order to ensure that the elastic member 3 can generate a sufficient and stable elastic force to the piston 2 during operation, the elastic member 3 is preferably a spring.

The cross-sectional shape of the air chamber 101 and the cross-sectional shape of the piston 2 at the same section are the same. In the present invention, the cross section of the air chamber 101 is circular, and accordingly, the cross section of the piston 2 is also circular.

The valve plug 4 and the valve body 1 are detachably connected, for example, by means of a clamping connection or a threaded connection. In this embodiment, the valve plug 4 and the valve body 1 are threadedly connected. In this threaded connection, the valve plug 4 is provided with an external thread, and the valve body 1 at the open end of the air chamber 101 is provided with an internal thread; or the valve plug 4 is provided with an internal thread, and the valve body 1 at the open end of the air chamber 101 is provided with an external thread. When the valve plug 4 and the valve body 1 are connected in a clamping manner, the valve plug 4 may be clamped into the air chamber 101 on the valve body 1 or may be clamped onto the outer surface of the valve body 1.

Figure 2:
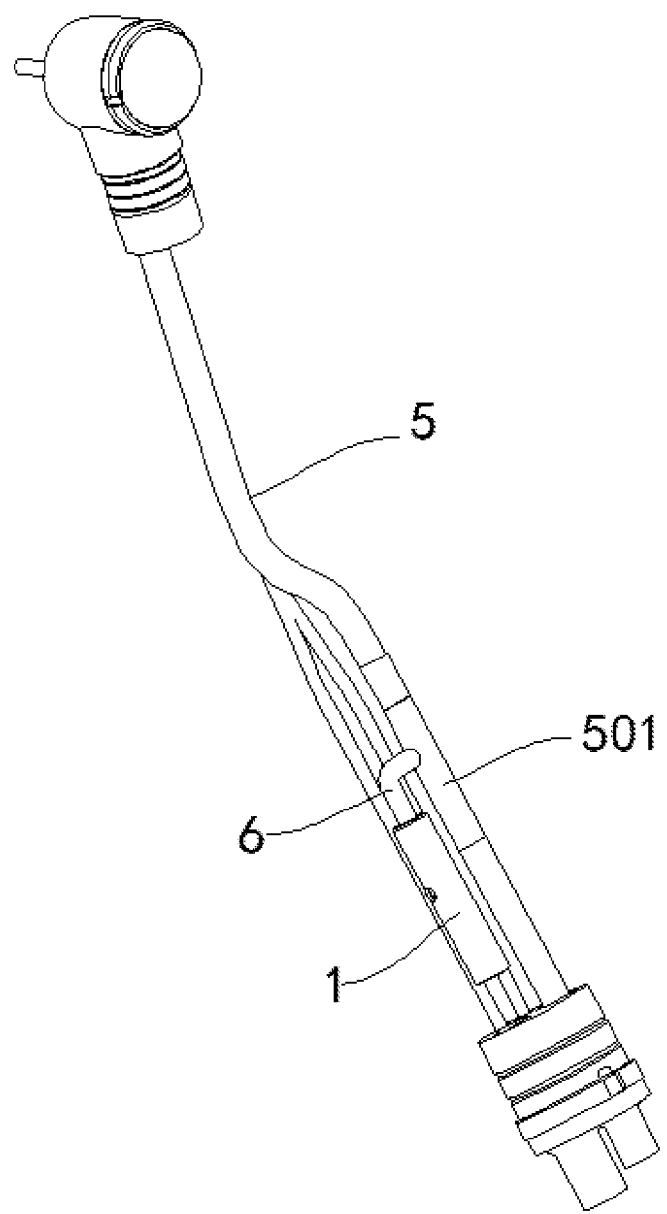
FIG. 2 is an application view of the present invention.
Figure 3:
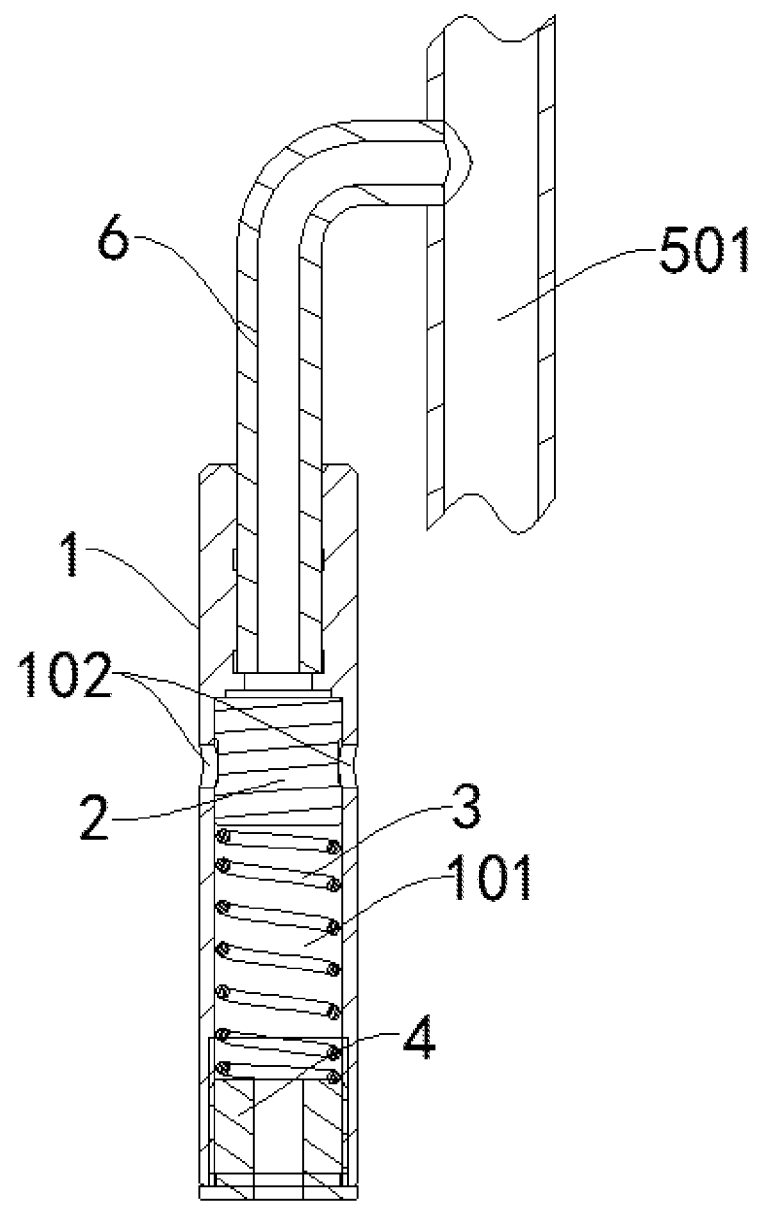
FIG. 3 is a partial cross-sectional view of FIG. 2.

As shown in FIGS. 2 and 3, the present invention further discloses a high-speed dental handpiece with an overload protection device. The high-speed dental handpiece includes a dental handpiece body 5, a side tube 6, and the overload protection device described above.

One end of the side tube 6 is in communication with an air intake passage 103, and the other end of the side tube 6 is in communication with a driving air tube 501 on the dental handpiece body 5. During connecting, the side tube 6 extends into the air intake passage 103 and is clamped therein.

Although the embodiments of the present invention have been illustrated and described above, it should be understood that the above-described embodiments are exemplary and are not to be construed as limiting the present invention. Those ordinary skilled in the art can make various changes, modifications, substitutions and variations to the above-described embodiments within the scope of the present invention.

We claim:

1. A high-speed dental handpiece, comprising:
a dental handpiece body having a driving air tube;
a side tube being in fluid communication with said dental handpiece body and having one end attached to said driving air tube and an opposite end; and
an overload protection device connected to said opposite end of said side tube,
wherein said overload protection device comprises:
a valve body, having a first end, a second end opposite said first end, an inner wall, and an outer surface so as to form an air chamber, an air intake passage between said first end and said air chamber, and a communication location between said air chamber and said air intake passage, said opposite end of said side tube being connected to said air intake passage, wherein said valve body is comprised of a plurality of air discharging holes in said communication location;
a piston, having an outer piston surface and being movably positioned within said communication location of said valve body;
an elastic member, being positioned within said air chamber between said piston and said second end; and
a valve plug being arranged at said second end of said valve body,
wherein the said elastic member is arranged between the said piston and the said valve plug, and
wherein said piston has a closed position within said communication location so as to cover said air discharging holes from within said valve body and an opened position between said communication location and said valve plug so as to uncover said air discharging holes, said piston being actuated between said closed position and said opened position according to said elastic member.

2. The dental handpiece, according to claim 1, wherein said outer piston wall is comprised of an annular groove.

3. The dental handpiece, according to claim 2, wherein each air discharging hole of said plurality of air discharging holes has an axial center, each axial center being coplanar with each other.

4. The dental handpiece, according to claim 3, wherein said annular groove of said piston is aligned with corresponding air discharging holes in said closed position.

5. The dental handpiece according to claim 3, wherein said plurality of air discharging holes is comprised of two air discharging holes, each of said two air discharging holes having respective axial centers, said respective axial centers being collinear.

6. The dental handpiece, according to claim 2, wherein said piston has a circular cross section.

7. The dental handpiece, according to claim 1, wherein said elastic member is comprised of a spring.

8. The dental handpiece according to claim 1, wherein said valve plug is removeably attached to said valve body.

9. The dental handpiece, according to claim 8, wherein said valve plug and said valve body are in removeable threaded engagement.

* * * * *